Patented Aug. 23, 1932

1,872,774

UNITED STATES PATENT OFFICE

MARTIN LUTHER AND HANS KLEIN, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

CATALYTIC OXIDATION OF ORGANIC COMPOUNDS

No Drawing. Application filed August 28, 1928, Serial No. 302,650, and in Germany October 6, 1927.

The present invention relates to the catalytic oxidation of organic compounds.

We have found that the catalytic oxidation of organic compounds can be very satisfactorily effected when metals are used as catalysts in the form of their enolates with an enolizable organic compound, such as acetoacetic ester, acetyl-acetone, benzoylacetone and the like. Enolates of such compounds distribute or dissolve readily in the substances to be oxidized, even in hydrocarbons. They also possess the advantage of having no tendency to deposit resinous, metalliferous masses, which is very important especially when the oxidation is carried out in the presence of fillers, since clogging of the surface of the fillers and consequent lowering of the yield is prevented.

Basic metallic enolates, or mixtures of metallic enolates with metal oxids, have also been found to be very effective oxidation catalysts. Such basic compounds or mixtures are obtainable, for example, by precipitating a metal salt with ammonia in the presence of the enolizable compound, over which the metal salt is in excess. Particularly efficient are the enolates of the metals of the 1st, 2nd and 3rd group of the periodic system, of the rare earth metals and especially of manganese.

The best method of effecting the oxidation is by dissolving small quantities of the metal enolate in the substance to be oxidized, preferably in the warm, and then passing oxygen, air or another gaseous oxidizing agent, or mixtures thereof through the heated mixture, until the product has attained the desired degree of oxidation. The temperature of working is generally between 100° and 180° C., preferably between 120° and 160° C.

The following examples will further illustrate the nature of the said invention which however is not limited thereto. The parts are by weight.

Example 1

100 parts of a mineral oil, boiling above 180 degrees centigrade and of the specific gravity of 0.824, are subjected to the action of a powerful current of air at 150 degrees centigrade for 5 hours, in a cylindrical vessel with ring fillings, the oil containing an addition of 0.10 part of basic manganese acetylacetonate. The resulting oil is only slightly discolored, and has the specific gravity of 0.955 and saponification value 150.

Example 2

66 parts of the neutral oxygen compounds obtained after separation of the acids from an oxidation product of higher aliphatic hydrocarbons, are treated with 0.05 part of neutral cerium acetylacetonate, and oxidized for 4 hours with a powerful current of air in the same apparatus as above. The resulting mixture has the saponification value 135.

Similar results are obtained when the cerium acetylacetonate is replaced by the manganese enolate used in Example 1 or by an enolate of tri-or tetravalent cerium, or by an enolate of nickel, cobalt or zinc and the like or mixtures thereof, and acetylacetone by benzoylacetone or acetoacetic ester.

Example 3

65 parts of a smooth paraffin wax are heated in a vessel provided with ring shaped filler bodies to 120° centigrade and a strong current of air is blown through, whereupon 0.05 part of manganese acetylacetonate is added and after about five minutes the temperature is raised to 150° centigrade. This temperature is kept constant for about 6 hours while blowing. A slightly yellow smooth oxidation product is obtained possessing an acid value of 73 and a saponification value of 191.

What we claim is:—

1. In the process of oxidizing organic compounds by passing a current of a gaseous oxidizing agent containing free oxygen through the material to be oxidized, while heating, the step which comprises carrying out the reaction in the presence of a metal enolate.

2. In the process of oxidizing organic compounds by passing a current of a gaseous oxidizing agent containing free oxygen through the material to be oxidized, while heating, the step which comprises carrying out the reaction in the presence of a basic metal enolate.

3. In the process of oxidizing organic compounds by passing a current of a gaseous oxidizing agent containing free oxygen through the material to be oxidized at a temperature between about 100° and about 180° centigrade, the step which comprises carrying out the reaction in the presence of manganese enolate.

4. In the process of oxidizing organic compounds by passing a current of a gaseous oxidizing agent containing free oxygen through the material to be oxidized at a temperature between about 100° and about 180° centigrade, the step which comprises carrying out the reaction in the presence of manganese acetylacetonate.

5. In the process of oxidizing paraffin hydrocarbons by passing a current of air at a temperature between 120° and 160° C. through paraffin wax, the step which comprises carrying out the reaction in the presence of about one thousandth the weight of the wax of manganese acetylacetonate.

6. In the process of oxidizing paraffin by passing a current of a gaseous oxidizing agent containing free oxygen through the said paraffin, while heating, the step which comprises carrying out the reaction in the presence of a metal enolate.

7. In the process of oxidizing a mineral oil by passing a current of a gaseous oxidizing agent containing free oxygen through the said mineral oil, while heating, the step which comprises carrying out the reaction in the presence of a metal enolate.

8. In the process of oxidizing a paraffin wax by passing a current of a gaseous oxidizing agent containing free oxygen through the said paraffin wax, while heating, the step which comprises carrying out the reaction in the presence of a metal enolate.

9. In the process of oxidizing a mineral oil by passing a current of a gaseous oxidizing agent containing free oxygen through the said mineral oil at a temperature between about 100° and about 180° C., the step which comprises carrying out the reaction in the presence of a metal enolate.

10. In the process of oxidizing a mineral oil by passing a current of a gaseous oxidizing agent containing free oxygen through the said mineral oil at a temperature between about 100° and about 180° C., the step which comprises carrying out the reaction in the presence of manganese acetyl-acetonate.

11. In the process of oxidizing a paraffin wax by passing a current of a gaseous oxidizing agent containing free oxygen through the said paraffin wax at a temperature between about 120 to about 160° C., the step which comprises carrying out the reaction in the presence of manganese acetyl-acetonate.

In testimony whereof we have hereunto set our hands.

MARTIN LUTHER.
HANS KLEIN.